No. 654,718. Patented July 31, 1900.
D. A. EBINGER.
GAS HEATING FURNACE.
(Application filed Apr. 6, 1899.)
(No Model.)
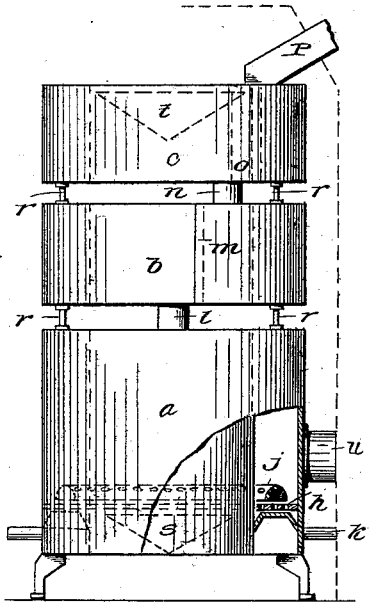
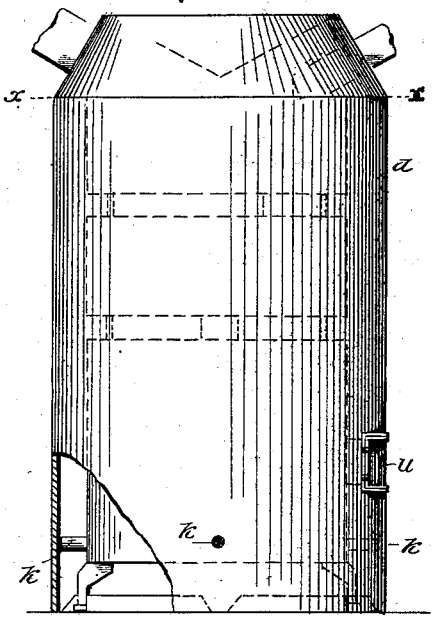
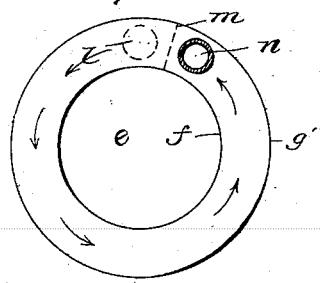
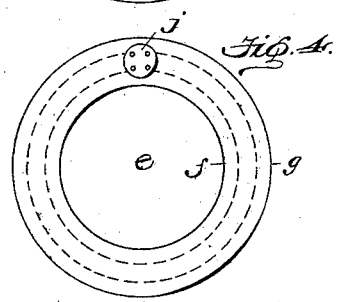
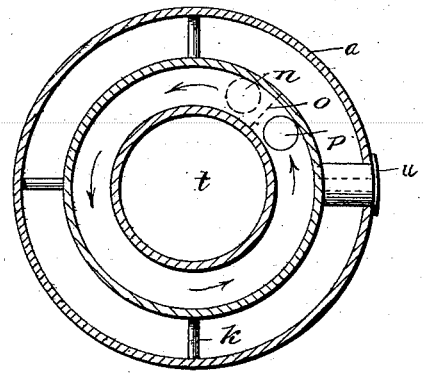
Witnesses:
Inventor
David A. Ebinger,
By David P. Moore.
Atty.
THE NORRIS PETERS CO., PHOTO-LITHO., WASHINGTON, D. C.

UNITED STATES PATENT OFFICE.

DAVID A. EBINGER, OF COLUMBUS, OHIO, ASSIGNOR TO THE VOGELGESANG FURNACE COMPANY, OF SAME PLACE.

GAS HEATING-FURNACE.

SPECIFICATION forming part of Letters Patent No. 654,718, dated July 31, 1900.

Application filed April 6, 1899. Serial No. 711,969. (No model.)

*To all whom it may concern:*

Be it known that I, DAVID A. EBINGER, a citizen of the United States, residing at Columbus, in the county of Franklin and State of Ohio, have invented a new and useful Improvement in Gas Heating-Furnaces, of which the following is a specification.

My invention relates to a class of furnaces for use in heating public and private buildings, and is specially constructed for the use of either natural or artificial gas as fuel, and is so designed that the heated air within the furnace proper is conducted through a series of cylindrical rings or drums having diaphragms for deflecting the heat and causing the draft to follow the complete circuit of each drum before discharging into the next drum of the series.

In the accompanying drawings, Figure 1 represents an elevation of the furnace proper with a portion of the outer wall broken away to show the burner. Fig. 2 represents the furnace with a surrounding jacket (a portion of which is broken away) for collecting the warm air and conveying it through the various conduits connected therewith. Fig. 3 represents a plan view of the intermediate circular drum $b$. Fig. 4 is a plan view of the circular bottom drum or combustion-chamber $a$. Fig. 5 is a sectional plan view of Fig. 2 on line $x\,x$, showing the upper drum $c$ surrounded by the jacket $d$.

Similar letters refer to similar parts throughout the several views.

The combustion-drum $a$ is constructed in the circular form, as shown in Figs. 1 and 4, with inner and outer walls $f$ and $g$, made of sheet metal or any other desirable substance, either cast or rolled, but preferably of sheet-iron. The bottom and top of the walls $f$ and $g$ are connected to each other and closed by a ring of sheet metal, same as the walls themselves, forming the entire drum into a closed double-walled cylinder, with the inner space or core $e$ left open. Near the bottom of the drum $e$ is a circular plate $h$, fitting closely between the walls $f$ and $g$ throughout the entire circumference, said plate $h$ being supported by wrought-iron brackets or other suitable means to the walls $f$ and $g$ and having air-holes perforated throughout its entire surface for the distribution of air to the circular burner $j$, resting thereon. The perforations of the plate $h$ are not intended to be made beneath the surface of the burner $j$, but only on each side of it, between it and the walls $f$ and $g$. Beneath the perforated plate $h$ are four or more tubes $k$, connecting the outer wall $g$ of the drum $a$ to the surrounding jacket $d$ for the purpose of conducting air into the drum $a$ beneath the plate $h$ for supporting combustion. The object of the perforations in the plate $h$ is to distribute the air taken in through the ducts $k$ throughout the entire circumference of the burner $j$.

The heat and products of combustion generated in the drum $a$ are conducted through the short connecting-flue $l$ into the drum $b$, which is constructed with inner and outer walls $f'$ and $g'$, closed in the same manner as drum $a$, but of less vertical height. As the heat is discharged into the drum $b$ it is compelled, by the diaphragm $m$, to follow the direction of the arrows shown in Fig. 3 around the entire circumference of the drum $b$ to the discharge-flue $n$, which communicates with the drum $c$, which is constructed in the same manner as drum $b$, having the diaphragm $o$ for deflecting the current in the direction of arrows shown in Fig. 5 around the entire circumference of this drum to the discharge-flue $p$ for communicating with the smoke-stack. The drums $b$ and $c$ are held separated from each other a short distance by the supports $r$ for the purpose of allowing the heated air generated within the inner space $e$ to pass through into the space between the drums and the surrounding jacket $d$.

The inverted conical deflector $s$ is placed at the bottom of the inner space $e$, as indicated in plans, and is intended to deflect the cold air which enters at the base of the furnace against the inner wall of the drums $a$, $b$, and $c$. The deflector $t$ at the top is for the purpose of preventing too rapid a circulation of the cool air through the center space $e$ and stands away from the wall $f$ sufficiently to allow of a limited circulation around it, at the same time confining the air within the space long enough to become thoroughly heated. A space is also left between the deflector $s$ and the wall $f$ for allowing the cold air to pass up, but in doing so to be forced against the heated surface of the drum.

The jacket $d$, surrounding the furnace, may be set up from the floor, as indicated, sufficiently to admit cool air to the furnace, or, if desired, it may be carried down to the floor and a cool or fresh air duct connected to it and carried to the outside of the building for the purpose of conveying fresh air from without.

A door $u$ is placed in the outer drum $d$, with a collar connecting it to the wall $g$ of the inner drum, for the purpose of lighting the gas within. The top of the drum $d$ is constructed with an inverted conical top, as indicated by dotted lines in Fig. 2, for the purpose of deflecting the heated air into the various ducts, which may be connected at or near the top, as desired, and in any necessary position.

The outer or surrounding jacket $d$ may be constructed of brick or sheet metal or any desirable material, but preferably of sheet-iron.

The burner $j$ need not be of any special type so long as it is constructed circular in form and having perforations both on the inner and outer sides in such position as to throw the flame against the walls $f$ and $g$. The connection of the burner to the supply-pipe for furnishing fuel may be made in any ordinary method for furnishing such fuel-supply.

As herein described, and illustrated in the accompanying drawings, I claim as my invention the following points, to wit:

In a gas heating-furnace, the combination of an outer casing, a series of annular drums mounted one above the other and having communication with each other, diaphragms arranged in said drums so as to form a continuous passage for the products of combustion around in the drums and through their connections with each other, a burner located near the bottom and in the lower annular drum, air-inlets communicating with said lower drum and the outside, a perforated plate located below the burner, and cold-air deflectors located at the bottom and top of the furnace in the center of the annular drums to allow the cold air to be properly supplied and held in the center of the drums to be heated.

DAVID A. EBINGER.

Witnesses:
ALBERT STRITMATTER,
C. H. WING.